United States Patent [19]
Pleso et al.

[11] Patent Number: 5,835,366
[45] Date of Patent: Nov. 10, 1998

[54] SECONDARY BATTERY BOOST CIRCUIT

[75] Inventors: Mark F. Pleso, Sharon, Pa.; Lee E. Leppo, Tallmadge, Ohio

[73] Assignee: Telxon Corporation, Akron, Ohio

[21] Appl. No.: 881,773

[22] Filed: Jun. 24, 1997

[51] Int. Cl.[6] .................................................... H02M 3/18
[52] U.S. Cl. ............................. 363/59; 323/222; 307/66
[58] Field of Search ...................... 323/21, 222; 363/59; 307/64, 66

[56] References Cited

U.S. PATENT DOCUMENTS

| | | | |
|---|---|---|---|
| 3,816,768 | 6/1974 | Stein | 307/64 |
| 4,209,710 | 6/1980 | Quarton | 307/66 |
| 4,214,827 | 7/1980 | Tominaga et al. . | |
| 4,355,619 | 10/1982 | Wilkinson . | |
| 4,488,057 | 12/1984 | Clarke | 307/66 |
| 4,719,550 | 1/1988 | Powell et al. | 363/37 |
| 4,847,545 | 7/1989 | Reid . | |
| 5,399,956 | 3/1995 | DeLuca et al. | 363/59 |
| 5,515,024 | 5/1996 | Ghia et al. . | |
| 5,517,153 | 5/1996 | Yin et al. | 327/546 |
| 5,526,253 | 6/1996 | Duley . | |
| 5,528,087 | 6/1996 | Sibata et al. . | |
| 5,560,023 | 9/1996 | Crump et al. . | |

*Primary Examiner*—Stuart N. Hecker
*Attorney, Agent, or Firm*—Renner, Otto, Boisselle & Sklar P.L.L.

[57] ABSTRACT

A secondary battery boost system which includes a primary power supply for a computing device, and a secondary power supply for the computing device. The boost system also includes a boost circuit operative to increase the power output of the secondary power supply applied to the computing device. Upon the output of the primary power supply falling below a level suitable for properly powering the computing device, the boost circuit feeds the computing device power from the secondary power supply. The boost circuit also boosts the power output of the secondary power supply so that the secondary power supply can be smaller and more light weight.

24 Claims, 3 Drawing Sheets

SECONDARY BATTERY BOOST CIRCUIT

TECHNICAL FIELD

The present invention relates in general to a battery boost circuit, and in particular to a secondary battery boost circuit for a portable computing device.

BACKGROUND OF THE INVENTION

In recent years, the use of wireless mobile terminals has become increasingly popular to help automate and expedite processes in retail, manufacturing, warehousing and other industries. For instance, in a retail environment the wireless mobile terminal may take the form of a wireless bar code reading device for use in tracking inventory and checking prices. In the warehousing industry, the same device may be used to keep accurate accounts of incoming and outgoing shipments. In the healthcare, transportation and other industries, the mobile terminal may take the form of a wireless pen based computer to aid in on-site document control procedures. The mobile terminals may operate independently by storing all information until later downloaded or may include a radio which allows it to communicate in real time to a host computer connected to a LAN, for example.

In order to allow for wireless operations, a power supply such as a battery pack is included in each mobile terminal. Typically, each battery pack will be made of rechargeable type batteries, such as Nickel-Cadmium (Ni-Cd) or Nickel-Metal-Hydride (NMH), which can supply several hours of uninterrupted operating time to a user before requiring recharging. However, due to the large amount of processing power needed to run most of today's standard wireless equipment, it is not uncommon for power to run out before a user has sufficient time to finish his/her current task. Therefore, in order to avoid loss of information in connection with currently active or unsaved files several safeguards exist.

One known safeguard against losing valuable information prior to a forced shutdown of a mobile terminal is to implement the Advanced Power Management (APM) shutdown protocol. The APM shutdown protocol is specially designed to operate in conjunction with a device running a Windows® based operating system. Upon a processor in the mobile terminal detecting that the main battery is running low, the APM shutdown protocol implements a series of steps which ensures for a save power down routine wherein no data is lost.

In order to accommodate reliable implementation of an APM shutdown protocol or other similar low power shutdown routine, there needs to be enough power remaining in the mobile terminal's power supply to ensure the full routine can be implemented. Unfortunately, with the power level of the main power supply already running low, there will oftentimes not be a sufficient amount of power to reliably run the full safe guard mechanisms in place. Thus, several manufactures of mobile terminals include a back up battery to handle the final power down stages if necessary.

As the reduced size and weight of a mobile terminal play significant factors in providing for an ergonomically marketable device, these factors are critical to the overall success of such products. Unfortunately, the back-up batteries needed to supply sufficient power to accommodate operating safeguard routines such as those described above require the use of valuable space inside the mobile terminal and add to the overall weight of the device.

Thus, there is a strong need for a method and/or apparatus for minimizing the size and weight of the secondary battery while still providing sufficient back-up power to accommodate any necessary routine(s).

SUMMARY OF THE INVENTION

The present invention provides for a boost circuit which engages a secondary "bridge" or back-up power supply upon an output of a primary power supply falling below suitable level. The boost circuit is coupled to a secondary power supplies, and feeds the output of the secondary power supply to a computing device. A monitoring circuit (e.g., wired OR connection) monitors the output level of both the primary and secondary power supplies. Upon the output of the primary power supply falling below a level suitable for properly powering the computing device, the monitoring circuit feeds the computing device power from the secondary power supply via the boost circuit. The boost circuit boosts the power output of the secondary power supply so that the secondary power supply can be smaller and more light weight than a typical power supply providing a power level comparable to that output via the boost circuit.

The computing device according to a preferred aspect of the present invention is a wireless, portable computing device. Such wireless, portable computing devices are desired to be relatively small in size and light in weight in order to facilitate their portable nature. The boost circuit provides for sustaining proper operation of the computing device and also facilitating the portability of the computing device by affording for the use of a less expensive, small and lightweight secondary power supply. As a result, the present invention provides for sustaining the proper operation of the device and facilitating the portable nature of a wireless, portable computing device.

In accordance with one aspect of the present invention, a secondary battery boost system is provided, including: a primary battery, the primary battery operative as a primary portable power supply for a computing device; a secondary battery, the secondary battery operative as a backup portable power supply for the computing device; and a boost circuit operative to increase the power output of the secondary battery applied to the computing device.

According to another aspect of the present invention, a method for facilitating power shutdown protocol of a computing device is provided, including the steps of: using a first cell as a primary portable power supply for the computing device; using a secondary cell as a backup portable power supply for the computing device; and using a boost circuit to increase the power of the secondary cell applied to the computing device; wherein the secondary cell supplies power to the computing device upon a voltage of the first cell dropping below a predetermined value.

In accordance with still another aspect of the present invention, a portable computing device is provided, including: a housing; a first battery supported by the housing, the first battery operative to supply power via a power supply to the portable computing device; a battery boost circuit disposed within the housing; a secondary battery coupled to the battery boost circuit, the secondary battery operative to supply power via the power supply to the portable computing device upon a voltage of the first battery falling below a predetermined value; wherein the battery boost circuit increases a power output of the secondary battery and provides the portable computing device with power from the secondary battery upon the voltage of the first battery falling below the predetermined value.

Another aspect of the present invention affords for a method of providing power to a computing device, including the steps of: providing power to the computing device via a primary power source; determining when an output power associated with the primary power source is below a threshold power level; and providing power to the computing device via a secondary power source when the output power associated with the primary power source is determined to be below the threshold power level, the secondary power source providing power through a power boost circuit.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
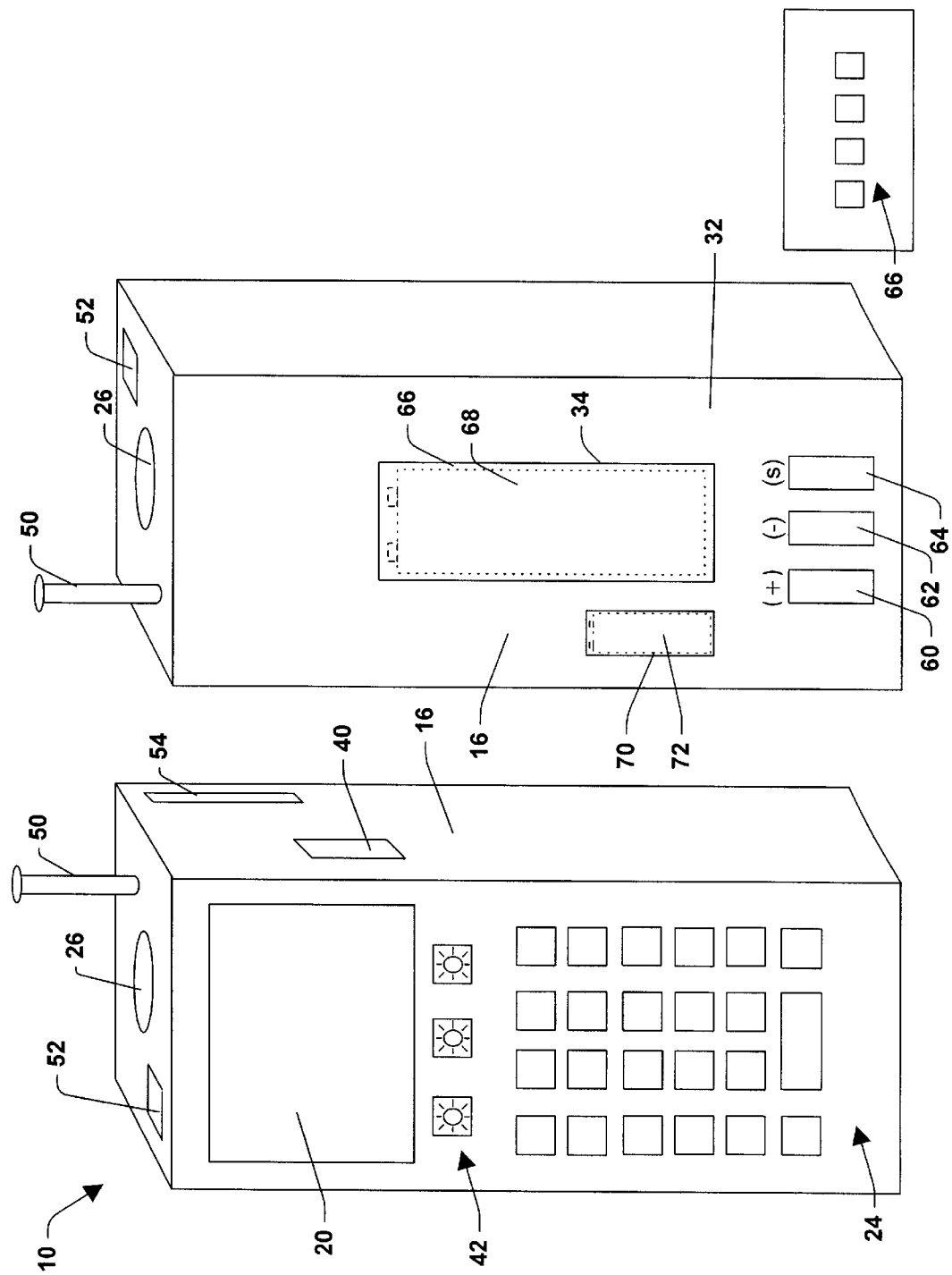
FIG. 1a is a perspective view of the front side of a portable computing device in accordance with the present invention.
FIG. 1b is a perspective view of the back side of the portable computing device of FIG. 1a in accordance with the present invention.
FIG. 1c is a bottom view of the portable computing device of FIG. 1a in accordance with the present invention.

The present invention will now be described with reference to the drawings, wherein like reference numerals are used to refer to like elements throughout. In the following description, numerous specific details are set forth such as electronic components, devices, etc. in order to provide a thorough understanding of the present invention. However, it will be apparent to one skilled in the art that the present invention may be practiced without these specific details. In other instances, well known circuits and structures are not described in detail in order not to obscure the present invention unnecessarily.

Referring initially to FIGS. 1a and 1b there is shown pictorial representations of front and back views, respectively, of a portable electronic device in accordance with the present invention and is generally designated 10. The present invention relates to a programmable mobile terminal (e.g., a portable teletransaction computing device (PTC)) in which a boost circuit (FIG. 2) is used to boost the power output of a secondary power source of the mobile terminal 10, and to contribute to sustaining the operation of the mobile terminal 10 by providing a suitable amount of power to the mobile terminal 10 to sustain operations described herein.

In the exemplary embodiments described hereinafter, the mobile terminal 10 is a hand held inventory control device used to communicate data such as inventory or the like within a cellular, narrow band or other radio communication system including multiple mobile terminals and base stations. However, it is recognized that the present invention contemplates other types of programmable mobile terminals or devices and portable computers and is not intended to be limited necessarily to hand held inventory control devices or devices which must wirelessly communicate information. The portable device 10 could also be any other device that is portable in nature and having electronic circuitry therein in accordance with the present invention. For example, the portable device 10 could be a laptop computer or notebook computer, a PDA, or even a cellular telephone or pager, which employs batteries or a charged cell.

According to one aspect of the invention as shown in FIGS. 1a and 1b, the portable device is a mobile terminal 10 used in a wireless communication network for tracking inventory, storing data, etc. The user may input and/or process data via a keypad, bar code scanner, etc. independent of the mobile terminal 10 being connected to a LAN, for example. When the mobile terminal 10 does not include a radio to provide for real time communications of data to a LAN, the data is stored in memory (FIG. 2) within the mobile terminal 10. In such circumstances, when the mobile terminal 10 is eventually connected to a LAN, the data can be transmitted to a host computer (not shown).

In this particular embodiment, the mobile terminal 10 includes a housing 16, a display 20 for displaying information to a user, a set of user interface keys 24 for allowing the user to input information and/or operational commands and a bar code scanner 26. The described components 20, 24 and 26 are located in the housing 16 which is an elongated enclosure of a size and including such contours as to conveniently fit into the open palm of the user. The housing 16 is preferably made of metal, high strength plastic, or the like. The housing 16 may be comprised of a number of shell portions such as for example front and rear shells 30 and 32 as well as a battery pack lid 34. The user interface keys 24 may include a full alpha-numeric keypad, function keys, enter keys, etc.

The display 20 may be a liquid crystal display (LCD) or the like. In the preferred embodiment, the display 20 is a fine pitch liquid crystal display operated as a standard CGA display with a resolution of 640×200 pixels. As is conventional, the display 20 functions to display data or other information relating to ordinary operation of the mobile terminal 10 in a cellular communication system. For example, the display 20 may display inventory information, pricing detail, etc. which is to be transmitted to or is received from a system backbone. Additionally, the display 20 may display a variety of functions that are executable by the mobile terminal 10. The display 20 is capable of displaying both alphanumeric and graphical characters.

The mobile terminal 10 also includes a window through which a bar code reader 26 is able to read a bar code label presented to the mobile terminal 10. Also included in the mobile terminal 10 is an ON/OFF power switch 40 for turning the device on and off. Furthermore, the mobile terminal 10 includes status lights 42 for indicating to the user such things as operation of a memory hard drive, low battery power, low power consumption, etc. The mobile terminal 10 also includes an antenna 50 which allows the mobile terminal 10 to transmit and receive data via an RF link to a network backbone such as a LAN (not shown). In the exemplary embodiment, the antenna 50 is an omnidirectional antenna but other types of antennas may equally be used. A speaker 52 is integral to the housing 16 and provides an audial output for the user. Additionally, the mobile terminal 10 includes a PCMCIA card slot 54 for receiving a PCMCIA card. As mentioned above, the mobile terminal 10 is user programmable and thus a user can input commercially available or user created software to tailor the mobile terminal 10 to execute desired functions.

The mobile terminal 10 further includes three electrical contacts 60, 62 and 64 exposed at the back side of the housing 16. Contacts 60 and 62 are employed to provide power from an external source (i.e., a cradle (not shown)) to the mobile terminal 10 and status contact 64 is used to provide a status signal to the external power source so that the status (i.e., docked, undocked, on or off) of the mobile terminal 10 can be determined. Furthermore, the status signal provided via status contact 64 may be used to determine the type of battery being used by the mobile terminal 10 so that the battery can be charged according to its particular charge characteristics. Referring now to FIG. 1C, the mobile terminal 10 also includes a set of four electrical contacts 66 located at the bottom of the housing 16. The four electrical contacts 66 are used for communications between the electronic circuitry within the mobile terminal 10 and a LAN system backbone (not shown). Preferably, all the contacts 60, 62 and 64 and 66 are made of a highly conductive metal that is resistant to corrosion such as for example Nickel Plated Beryllium Copper.

Turning back to FIGS. 1a and 1b, a battery pack 66 is located on the back side of the mobile terminal 10. The battery pack 66 is dimensioned to receive and hold a rechargeable battery (or batteries) 68 which provides a total nominal voltage of about 7.2 volts. This voltage corresponds to the preferred supply voltage of the mobile terminal 10. The battery 68 serves as the primary portable power supply for the mobile terminal 10. The battery pack 66 is adapted to be easily removable and installable. Accordingly, the user can carry a spare battery pack preloaded with primary battery 68 to replace a battery pack with dead batteries. The battery pack 68 is designed to prevent being inserted in the mobile terminal 10 in the wrong direction so as to avoid possible damage to the mobile terminal 10.

Also located on the back side of the mobile terminal 10 is a secondary battery pack 70. The secondary battery pack 70 is dimensioned to receive and hold a secondary battery 72 (i.e., secondary portable power supply) which outputs a total nominal voltage of approximately 3.6 volts. As will be discussed in greater detail below, the secondary battery 72 serves to provide power to the mobile terminal 10 upon the output of the primary battery 68 (i.e., primary portable power supply) falling below a predetermined level. As a result, the secondary battery 72 affords for sustaining the operations of the mobile terminal 10 for a period of time sufficient to shut down properly and avoid the loss of valuable data.

Figure 2:
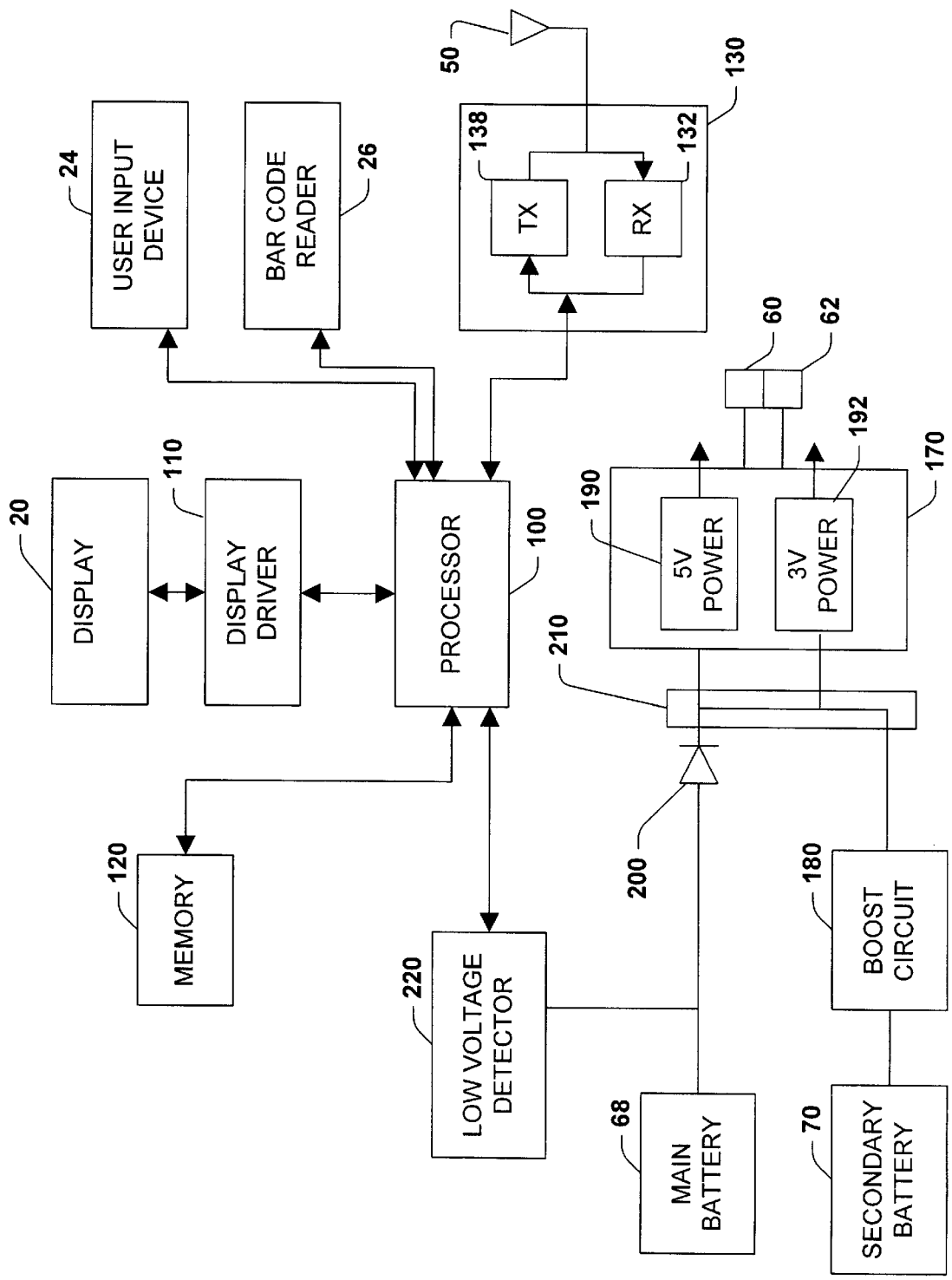
FIG. 2 is a block diagram of a portable computing device in accordance with the present invention.

FIG. 2 is a block diagram representing the basic structure of the mobile terminal 10 in accordance with an exemplary embodiment of the present invention. The mobile terminal 10 includes a processor 100 which can be programmed to control and to operate the various components within the mobile terminal 10 in order to carry out the various functions described herein. The processor 100 can be any of a plurality of processors, such as the 486DX/33, 486DX2/66, 486DX4/50-100, 486DX4/33-100, 486DX4/33-83, p24T, Pentium 50/75, Pentium 60/90, and Pentium 66/100, and other similar and compatible processors. The processor 100 functions to perform various operations described herein as well as for carrying out other operations related to the mobile terminal 10. The manner in which the processor 100 can be programmed to carry out the functions relating to the present invention will be readily apparent to those having ordinary skill in the art based on the description provided herein.

The processor 100 is coupled to a user input device 24 which allows an operator to input data to be communicated to a Local Area Network (LAN) such as inventory data, patient information, etc. This information may be sent to a host computer (not shown) which serves as a central data location, for example, or to a cash register connected to a system backbone, etc. The input device 24 can include such items as a keypad, touch sensitive display, etc. The mobile terminal 10 also may include a bar code reader 26 coupled to the processor 100 for providing another form of data input. The bar code reader 26 and the aforementioned input device 24 may be coupled to the processor 100 via a user input interface circuitry (not shown). The user input interface circuitry could perform any conventional conditioning of the output signals from the bar code reader 26 and input device 24 as may be appropriate so that they may be received by the processor 100.

The display 20 is also connected to and controlled by the processor 100 via a display driver circuit 110. The display 20 serves as a means for displaying information stored within the mobile terminal 10 and/or received over a system backbone, for example. As mentioned above, the display 20 can be a flat panel liquid crystal display with alphanumeric capabilities, for example, or any type of display suitable for the present invention as will be appreciated.

A memory 120 is included in the mobile terminal 10 for storing information such as program code executed by the processor 100 for carrying out the functions described herein. The actual code for performing such functions could be easily programmed by a person having ordinary skill in the art for computer programming in any of a number of conventional programming languages based on the disclosure herein. Consequently, further detail as to the particular code has been omitted for sake of brevity. The memory 120 also serves as a storage medium for storing information input by the user and/or received from or transmitted by a transceiver such as RF section 130. The memory 120 may include both volatile and non-volatile memory, and may include a hard drive or other high density storage medium. For example, the memory 120 may include a Random Access Memory (RAM) and a Read Only Memory (ROM). The RAM would provide program instruction storage and working memory for the processor 100. The ROM could contain software instructions known as the Basic Input/Output System (BIOS) for performing interface operations with input/output (I/O) devices.

The RF section 130 is also connected to the processor 100. The RF section 130 includes an RF receiver 132 which receives RF transmissions from a base station (not shown), for example, via the antenna 50 and demodulates the signal to obtain digital information modulated therein.

The RF section 130 also includes an RF transmitter 138. In the event the mobile terminal 10 is to transmit information in response to an operator input at the input device 24, for example, the processor 100 forms within the memory 120 an information packet (not shown) including data together with a source address (i.e.,the address of the particular mobile terminal 10 sending the information) and a destination address (e.g., a host computer (not shown)). The information packet is then delivered to the RF transmitter 138 which transmits an RF signal with the information packet modulated thereon via the antenna 50 to the destination device. An example of a suitable RF section 130 for use in the mobile terminal 10 is the Model 025 Direct Sequence Spread Spectrum Radio Module, which is commercially available from Aironet Wireless Communications, Inc. of Akron, Ohio.

The mobile terminal 10 further includes a unit power supply 170 which provides power to the mobile terminal 10. The unit power supply 170 is coupled to contacts 60 and 62 and also to the primary portable power supply (i.e., main battery) 68. The unit power supply 170 is also tied via a boost circuit 180 to the secondary portable power supply (i.e., secondary battery) 70. Thus, when the mobile terminal 10 is in a mobile state, the unit power supply 170 provides power to the mobile terminal 10 via either the primary battery 68 or the secondary battery 70. When the mobile terminal 10 is docked in a cradle (not shown), for example, the unit power supply 170 can receive power externally via contacts 60 and 62 in order to operate the mobile terminal 10 as well as charge the primary battery 68 and/or the secondary battery 70. It is to be appreciated that the scope of the present invention is intended to include any suitable battery types or charge storing cells for use in the mobile terminal 10 according to the present invention.

As mentioned above, the main battery 68 provides primary power to the mobile terminal 10. The unit power supply 170 includes both a 5 volt power supply circuit 190 and 3 volt power supply circuit 192. The main battery 68 is tied to both the 5 volt power supply circuit 190 and 3 volt power supply circuit 192 via diode 200. The purpose of diode 200 is to ensure power from the main battery 68 flows in only a desired direction. The diode 200 has a 0.2 volt drop associated therewith. Thus the voltage input to the diode 200 by the primary battery 68 will be output at 0.2 volts less than what was input. The 5 volt power supply circuitry 190 converts power it receives to a steady 5 volt DC power for system components which operate at this level and the 3 volt power supply circuitry 192 similarly converts power it receives to a steady 3 volt DC power level for system components which operate at the 3 volt level.

Also tied to the 5 volt and 3 volt power supply circuits 190, 192 through boost circuit 180 is the secondary battery 70. The secondary battery 70 of the present invention is made up of three Ni-Cd type batteries which output a total nominal voltage of approximately 3.6 volts. In the preferred embodiment, the boost circuit 180 is a MAZ1771 boost circuit manufactured by Maxim. However, it will be appreciated that any suitable boost circuit or means for boosting the power output of the secondary battery 70 may be employed to carry out the present invention.

According to one specific aspect of the present invention, the boost circuit 180 operates by winding current through a conductive coil (not shown). The coil is very rapidly connected and disconnected from ground. The act of disconnecting the coil from ground produces an electro-magnetic field current (EMF) at a desired voltage level which is greater than the nominal voltage output by the secondary battery 70 itself. In the present invention, the higher desired voltage level (e.g., approximately 5.2 volts) can be produced for approximately 90 seconds. It typically only takes 15 seconds to complete an APM shutdown as discussed in greater detail below.

The mobile terminal 10 has four power management states: a normal operating state, a standby state, a suspend state, and an off state. One switch 40 is used to change between the off state, the normal operating state, and the suspend state.

The normal operating state of the mobile terminal 10 of the present invention is virtually identical to the normal operating state of any typical desktop or laptop computer. Users may use applications and basically treat the computer as any other. One difference is the presence of a power management driver, which runs in the background (in the BIOS and the operating system), transparent to the user. The portion of the power management driver in the operating system (OS) is the Advanced Power Management (APM) advanced programming interface written by Intel and Microsoft, which is now present in most operating systems written to operate on Intel's 80X86 family of processors. The portion of the power management driver in BIOS (APM BIOS) communicates with an APM OS driver. The APM OS driver and APM BIOS routines together control the transition of the mobile terminal 10 to and from the other three states.

The second state, the standby state, uses less power than the normal operating state, yet leaves any applications executing as they would otherwise execute. In general, power is conserved in the standby state by placing devices in their respective low-power modes.

The third state is the suspend state. In the suspend state, mobile terminal 10 consumes an extremely small amount of power. The suspended mobile terminal 10 consumes very little power from the main battery 68. The only power consumed is small amount of power to maintain the circuitry that monitors the switch 40. This small use of power is accomplished by saving the state of the mobile terminal to the fixed disk storage device (the hard drive of the memory 120) before the power supply is turned "off". To enter the suspend state, the processor 100 interrupts any executing code and transfers control to its power management driver. The power management driver ascertains the state of the mobile terminal 10 and writes the state of the mobile terminal 10 to the fixed disk storage device 120. The state of the CPU registers, the CPU cache, the system memory, and the other devices' registers are all written to the fixed disk 120. The entire state of the mobile terminal 10 is saved in such a way that it can be restored without the code applications being adversely affected by the interruption. The processor 100 then writes data to the non-volatile CMOS memory indicating that the system was suspended. Lastly, the processor 100 causes the unit power supply 170 to stop supplying full power. The entire state of the mobile terminal 10 is safely saved to the fixed disk storage device, system power is now "off," and the mobile terminal 10 is now only receiving a small amount of regulated power from the unit power supply 170 to power the circuitry that monitors the switch 40.

The fourth and final state is the off state. In this state, the unit power supply 170 ceases providing regulated power to the mobile terminal 10, but the state of the mobile terminal 10 has not been saved to the fixed disk 120. The off state is virtually identical to typical desktop computers being turned off in the usual manner.

Switching from state to state is handled by the power management driver and is typically based on closure events of a single switch, a flag, and two timers; an inactivity standby timer and an inactivity suspend timer. The mobile terminal 10 has a single power switch 40. This switch 40 can be used to turn on the mobile terminal 10, suspend the state of the mobile terminal 10, restore the state of the mobile terminal 10, and turn off the mobile terminal 10.

The mobile terminal 10 uses advanced power management (APM) to facilitate the state transitions and system maintenance associated with the state transitions. As mentioned above, APM is an industry standard advanced programming interface that was developed to provide a way for operating systems and system BIOS in desk top and notebook computer systems to cooperatively manage power.

APM provides an excellent tool that facilitates suspending and resuming the system because it involves the operating system in the suspend process and allows the operating system to prepare the system before the suspend process occurs.

The present invention employs the boost circuit 180 to boost the voltage of the secondary battery 70 for a period of time sufficient to complete the APM protocol so that the loss of data is minimized. In other words, the present invention uses the secondary battery 70 as a backup to the primary battery 68 so that operations (e.g., APM protocol) of the mobile terminal 10 can be sustained for a period of time sufficient for saving valuable data that might otherwise be lost in the event of rapid degradation of the power supply from the primary battery 68.

The main battery 68 and secondary battery 70 are wired "OR" ed together at the wired OR connection 210. The wired or connection 210 provides for a unique switching technique between the main battery 68 and secondary battery 70 which eliminates the need to provide for intricate switching circuity as is currently known and done in the art. Furthermore, the wired OR connection 210 provides an added benefit of automatically switching to the secondary battery 70 in the event the main battery 68 is accidently or purposefully removed from the mobile terminal 10. Wired OR connections are known in the art and therefore detailed discussions thereto is omitted in order not to cloud an understanding of the present invention. It is to be understood that any suitable wired OR connection may be employed to carry out the present invention. Furthermore, it will be appreciated that any suitable circuit and/or device for switching between the primary battery 68 and secondary battery 70 as power supplies for the mobile terminal 10 may be used to carry out the present invention.

As was mentioned above, the main battery 68 outputs a higher voltage level of approximately 7.2 volts, and will typically be the primary supplier of power to the 5 v and 3 v power supply circuits 190, 192. However, upon the power output level of the main battery 68 dropping below a predetermined level, the 5 v and 3 v power supply circuits 190, 192 will automatically be fed from the secondary battery 70 via the boost circuit 180 and the wired OR connection 210.

A low voltage detection circuit 220 is also tied to the primary battery 68. The low voltage detection circuit 220 serves to detect when the primary battery 68 drops below 5.4 volts and then initiates an APM shutdown routine by sending a signal to the processor 100. Even after the low voltage detection circuit 220 begins the shutdown routine, the main battery will continue to provide power unless and until the voltage of the main battery 68 drops below the voltage level output from the secondary battery 70 via the boost circuit 180. The present invention provides that the voltage level triggering the shutdown routine by the low voltage detector 220 is to be greater than the voltage level asserted from the boost circuit 180 in order to ensure the secondary battery 70 is not prematurely drained prior to the APM shutdown protocol being initiated.

Figure 3:
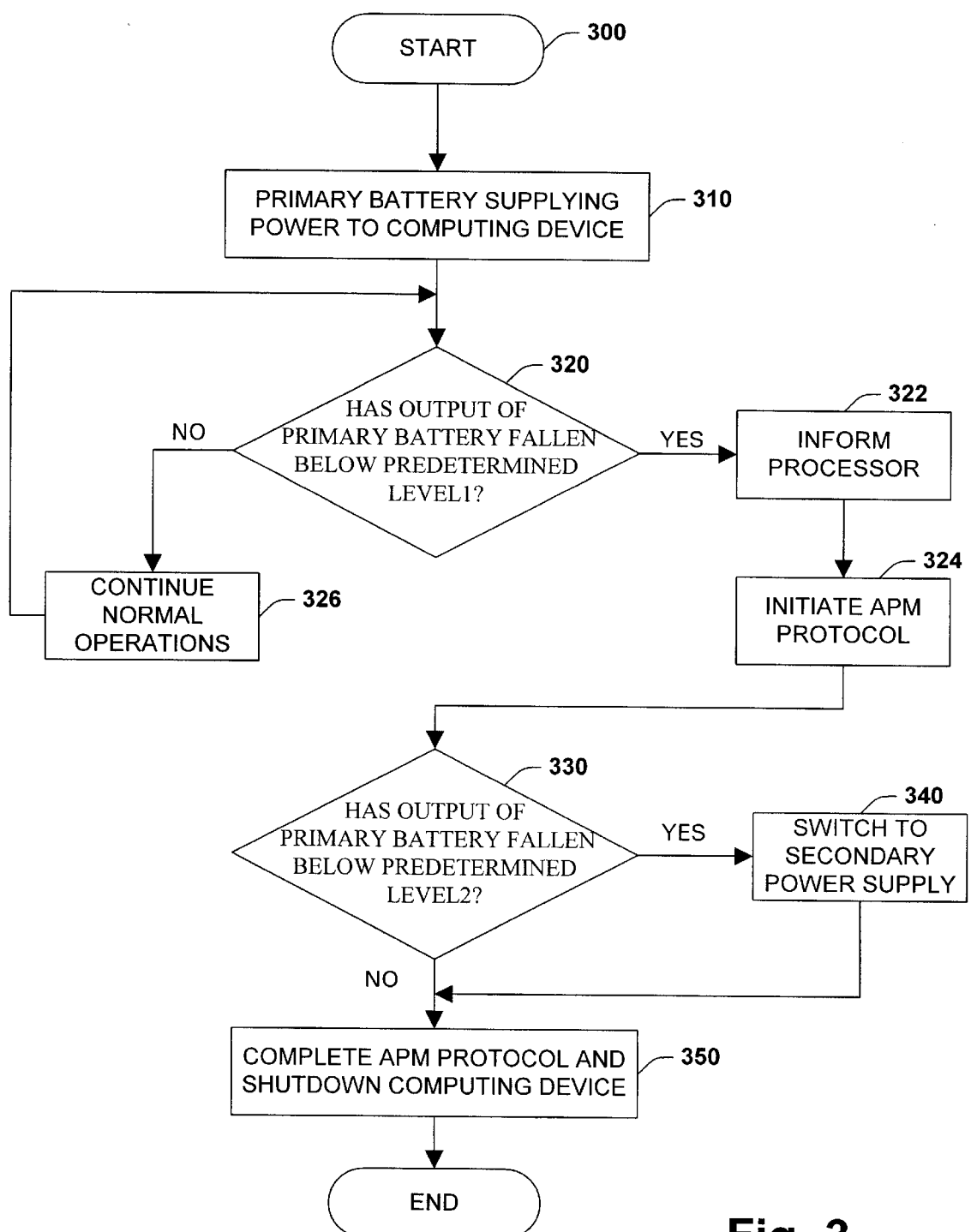
FIG. 3 is a flowchart illustration a process for engaging a secondary power supply according to one aspect of the present invention.

Turning now to FIG. 3, the details of the process carried out by the present invention in which the secondary battery output is boosted and is employed to sustain the operations of the mobile terminal 10 upon the output of the primary battery 68 falling below a predetermined level is described.

Beginning in step 300, the processor 100 starts power-on and general initializations as part of the overall initializations of the processor 100. Such initializations are conventionally known and are not further discussed for sake of brevity. In step 310, the main battery 68 is supplying power to the mobile terminal 10 in a conventional manner. In step 320, the voltage detector 220 is monitoring the output of the primary battery 68 to determine if its output has fallen below a predetermined level (i.e., LEVEL 1). In the preferred embodiment, the voltage detector 220 monitors for the output voltage of the primary battery 68 falling below 5.4 volts. If yes, the output voltage has fallen below 5.4 volts, the voltage detector 220 sends a signal to the processor 100 in step 322. The processor 100 in step 324 in response to the signal initiates the APM protocol. In step 330, the wired OR connection is continuously monitoring the output power of both the primary battery 68 and the secondary battery 70 (via the boost circuit 180). The wired OR connection 170 provides for using the output of the primary battery 68 first and in the event the output of the primary battery falls below a predetermined level (i.e., LEVEL 2) (e.g., 5.2 volts; a voltage level below that output by the boost circuit 180), the wired OR connection 210 will switch to the output of the secondary battery 70. If in step 330, it is determined that the output power of the primary battery 68 has not fallen below predetermined LEVEL 1, the mobile terminal 10 will continue normal operations in step 326.

Thus, in step 330, the wired OR connection 210 monitors the voltage output of the primary battery 68—the output is typically above 5.2 volts. If the voltage output of the primary battery 68 is equal to or above the predetermined threshold (LEVEL 2) (e.g., 5.2 volts), the wired OR connection 210 will continue using the primary battery 68 as a power source for the unit power supply 170. If in step 336, the output power of the primary battery 68 falls below the predetermined threshold LEVEL 2, the wired OR connection 210 in step 340 will switch to the secondary battery 70 as the source for the unit power supply 170. As mentioned above, the boost circuit 180 boosts the output of the secondary battery to a point that is equal to or above the predetermined threshold LEVEL 2. The secondary battery outputs a total nominal voltage of 3.6 volts which is boosted to 5.2 volts or above by the boost circuit 180. The boost circuit 180 is able to maintain boosting the output of the secondary battery for a period of time (e.g., 90 seconds) sufficient for the APM protocol to be completed. Typically, the APM protocol under Windows® takes approximately 15 seconds to complete. Thus, in step 350, the processor 100 will complete the APM protocol and shut down the mobile terminal 10 in a suitable manner so that valuable data is not lost.

Although the present invention was described in connection with a mobile terminal 10, it will be appreciated that the present invention may be applied to almost any type of computing device (e.g., laptop computer, cellular telephone, portable computing devices used in the medical arena, etc.) that employs a primary battery and a secondary backup battery.

The employment of a boost circuit to boost the voltage of a secondary battery affords for employing a lighter weight and smaller secondary battery. Manufacturers of batteries oftentimes produce batteries with power outputs proportional to the size and weight of the battery. Thus, larger, heavier batteries sold in the marketplace generally provide a higher power output as compared to smaller, lighter batteries. Although, smaller, lighter batteries with relatively high power output are available, they tend to be significantly more expensive than batteries of comparable size and weight having less power output. By employing the boost circuit to boost the output of the secondary battery to a desired level, a less expensive secondary battery of smaller size and lighter weight can be used. As a result, the reduction in size and weight of the secondary battery directly relates to a smaller and lighter computing device (e.g., mobile terminal 10), and furthermore allows for the use of a less expensive secondary battery.

The description herein with reference to the figures will be understood to describe the present invention in sufficient detail to enable one skilled in the art to utilize the present invention in a variety of applications and devices. The present invention includes all such equivalents and modifications, and is limited only by the scope of the following claims.

What is claimed is:

1. A secondary battery boost system, comprising:
   a primary battery, the primary battery operative as a primary portable power supply for a computing device;
   a secondary battery, the secondary battery operative as a backup portable power supply for the computing device; and
   a boost circuit operative to increase the power output of the secondary battery applied to the computing device.

2. The secondary battery boost system of claim 1, wherein the boost circuit is adapted to provide power to the computing device from the secondary battery when a voltage of the primary battery falls below a predetermined threshold.

3. The secondary battery boost system of claim 2, further including a low voltage detection circuit for monitoring the voltage level of the primary battery.

4. The secondary battery boost system of claim 3, wherein the secondary battery supplies power to the computing device in order to sustain an advanced power management protocol when the power output of the primary battery falls below a predetermined threshold.

5. The secondary battery boost system of claim 4, wherein the boost circuit increases the power output of the secondary battery for a time period sufficient to complete the advanced power management protocol.

6. The secondary battery boost system of claim 1, wherein the computing device is a wireless mobile terminal.

7. A method for facilitating power shutdown protocol of a computing device, comprising the steps of:
   using a first cell as a primary portable power supply for the computing device;
   using a secondary cell as a backup portable power supply for the computing device; and
   using a boost circuit to increase the power of the secondary cell applied to the computing device;
   wherein the secondary cell supplies power to the computing device upon a voltage of the first cell dropping below a predetermined value.

8. The method for facilitating power shutdown protocol of a computing device of claim 7, wherein the step of the boost circuit increasing the voltage of the secondary cell applied to the computing device includes the step of the boost circuit providing power to the computing device from the secondary cell when a voltage of the primary cell falls below a predetermined threshold.

9. The method for facilitating power shutdown protocol of a computing device of claim 8, further including the step of using a low voltage detection circuit to monitor the voltage level of the primary cell.

10. The method for facilitating power shutdown protocol of a computing device of claim 7, further including the step of coupling the primary cell and the secondary cell to the boost circuit via a wired OR connection.

11. The method for facilitating power shutdown protocol of a computing device of claim 7, further including the step of using the secondary cell to supply power to the computing device in order to sustain an advanced power management protocol.

12. The method for facilitating power shutdown protocol of a computing device of claim 7, further including the step of using the boost circuit to increase the voltage output of the secondary cell for a time period sufficient to complete the advanced power management protocol.

13. A portable computing device, comprising:
   a housing;
   a first battery supported by the housing, the first battery operative to supply power via a power supply to the portable computing device;
   a battery boost circuit disposed within the housing;
   a secondary battery coupled to the battery boost circuit, the secondary battery operative to supply power via the power supply to the portable computing device upon a voltage of the first battery falling below a predetermined value;
   wherein the battery boost circuit increases a power output of the secondary battery and provides the portable computing device with power from the secondary battery upon the voltage of the first battery falling below the predetermined value.

14. The portable computing device of claim 13, wherein the boost circuit is adapted to provide power to the portable computing device from the secondary battery when a power output of the primary battery falls below a predetermined threshold.

15. The portable computing device of claim 14, further including a low voltage detection circuit for monitoring the voltage level of the primary battery.

16. The portable computing device of claim 14, wherein the secondary battery supplies power to the computing device in order to sustain an advanced power management protocol when the power output of the primary battery falls below the predetermined threshold.

17. The portable computing device of claim 13, wherein the first battery and the secondary battery are coupled together via a wired OR connection.

18. The portable computing device of claim 13, wherein the portable computing device is a wireless mobile terminal.

19. The portable computing device of claim 13, wherein the portable computing device is a laptop computer.

20. A method of providing power to a computing device, comprising the steps of:
   providing power to the computing device via a primary power source;
   determining when an output power associated with the primary power source is below a threshold power level;
   sensing the primary power source to determine if the output power associated with the primary power source falls below a predetermined power level;
   providing power to the computing device via a secondary power source when the output power associated with the primary power source is determined to be below the threshold power level, the secondary power source providing power through a power boost circuit; and
   triggering an advanced power management shutdown protocol upon determining that the output power is below the predetermined power level.

21. The method of claim 20, wherein the primary power source and the secondary power source are coupled together via a wired OR connection.

22. The method of claim 21, wherein the predetermined power level is greater then the threshold power level.

23. The method of claim 22, wherein the step of triggering an advanced power management shutdown protocol upon determining that the output power is below the predetermined power level, includes the step of using a low voltage detection circuit to monitor the voltage level of the primary power source.

24. The method of claim 23, wherein the computing device is a portable computing device capable of wireless communication.

* * * * *